Oct. 31, 1933.   J. L. ANDERSON   1,933,133
METHOD AND APPARATUS FOR WELDING PIPE
Filed Jan. 13, 1931   2 Sheets-Sheet 1

INVENTOR
James L. Anderson
BY
ATTORNEY

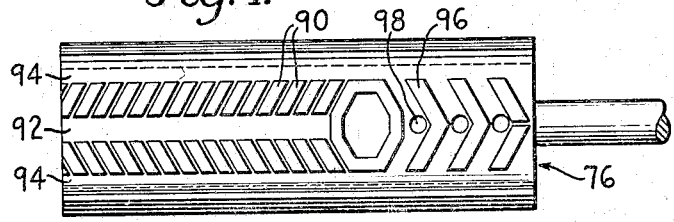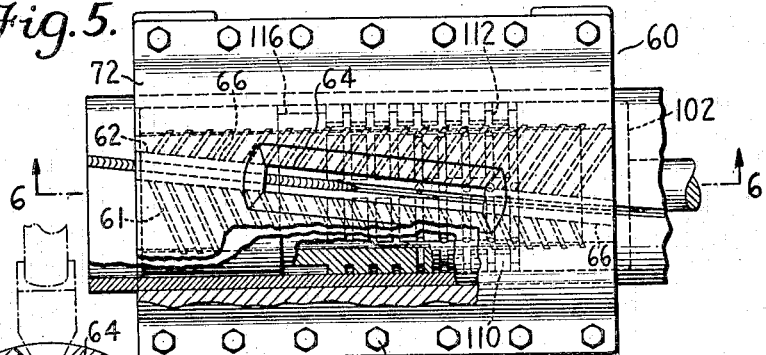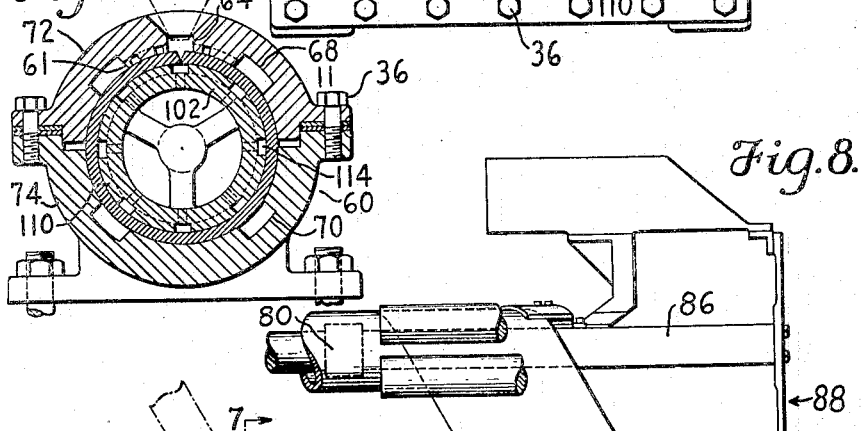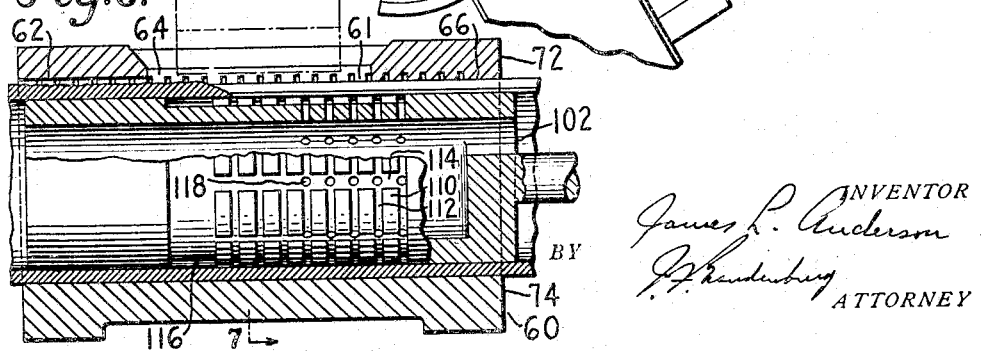

Patented Oct. 31, 1933

1,933,133

UNITED STATES PATENT OFFICE 1,933,133

METHOD AND APPARATUS FOR WELDING PIPE

James L. Anderson, Tenafly, N. J., assignor to Air Reduction Company, Incorporated, New York, N. Y., a corporation of New York Application January 13, 1931. Serial No. 508,428

18 Claims. (Cl. 113—59)

This invention relates to welding pipe or tube, and to apparatus therefor.

In the customary operations pursued in manufacturing pipe or tube from sheet or plate metal, the flat metal is first deformed into tubular shape, either by bending the side edges of the sheet directly toward each other, or by twisting or coiling the sheet into helical form and bringing the adjacent twisted edges into contact; thereafter the seams formed at the contacted edges may be fused together by any well-known method.

In either of these processes, there arises the problem of alining and retaining abutted or in opposed relation the sheet edges during the welding operation, in order finally to obtain a finished product wherein the fused edges will form a substantially continuous and integrated part of the pipe body and will display no undesirable or substantial offset or similar defect. Many methods of positioning the side edges have been utilized, but so far as I am informed in all of these cases the edges, notwithstanding the influence of some holding device, are free to move of their own accord and in practically unrestrained manner under the action of expansive and contractive stresses set up by the fusion and congelation of the metal at the points where the edges are fused together. The seam edges have, therefore, been known to assume many undesired displaced relationships.

Further, gases in the immediate neighborhood of the welding position become heated and rise, thus resulting in a heat loss not ordinarily controllable. In those cases where combustible gases are used as the heating medium for producing the high temperatures requisite for welding, or where gases or gas forming substances of any preferred composition are used to form a gas layer around welding apparatus, as in the operation of the sheathed electric arc, there is present at the welding point at all times during the operation a moving body of gas, such gas body itself being capable of absorbing and carrying away large quantities of the heat energy brought to the welding point during the process. Ordinarily, when combustible gases are used, the portions thereof which are not consumed at the welding point rise upwardly from the welding point and burn around the device from which the gases are directed at the metal to be welded, thus making the entire operation both uneconomical and uncomfortable.

It is an object of this invention to provide a method, and apparatus for use in such method, for welding pipe in which relative movement of the seam of the pipe or tube and of the welding device is effected, the seam being guided past the device while the seam edges are positively retained in opposed and alined relationship during the welding operation.

It is an additional object of this invention to provide a method of welding pipe or skelp, and guiding means for pipe or skelp for use in such method, in which the heat absorbed by gases around the welding device or carried by the gases formed at or conducted to the welding point during the process will be utilized effectively for heating the body of the pipe, preferably for heating it both away from the seam and along the seam in advance of the portion already welded. The weld is thus made by gradually and evenly raising the temperature of the area of metal to be welded. The effective heating area is, in consequence, made larger than in the ordinary method of welding such seams in which the effective heat is limited in its action to a substantially restricted area, namely that within but a very slight distance from the seam edges. Due to the gradation of temperature in the metal in the areas removed from the seam edges, the crystals of metal which result on congelation will be finer and of greater strength than in those cases where the heating was accomplished in the manner previously followed. Further, due to spreading out the heating over the body of the pipe, the effect of localized expansive stresses is substantially reduced and the demarcation of the welded seam is made substantially indistinct, indicating a crystal structure of finely graded characteristics.

These results are preferably accomplished by providing a guide which will substantially enclose the pipe or tube at and including the region where the tube is fed past the welding means. The guide is substantially the same in internal diameter as the effective outside diameter of the deformed sheet or plate, but does not, however, contact the deformed sheet or plate throughout the surface thereof, such contact being had only at spaced apart portions. Among the portions of the sheet or plate engaged by the surface of the guide are the seam margins. The inner surface of the guide, where it is intended to engage the seam margins, is preferably formed in conformity with the plan disclosed in my copending application Serial No. 430,069, filed February 20, 1930, that is, the surface is cut out to present, for contact with the tube walls, a plurality of substantially parallel ribs, divergingly extending, in a preferred arrangement, from the position to be taken by the seam margins. An opening through a wall of the guide at this particular portion of the guide provides means for directing the application of the heating means in fusing the seam closed. In this way, hot gases, formed at or delivered to the point of welding, are conducted away from that point and over the body of the pipe, and by the angularity of the ribs the gases can be caused to move in a direction to preheat the metal of the seam margins in advance of the direct application thereto of the welding means. The action of the ribs in any case is to conduct the hot gases around the pipe body, heating the metal of the pipe body away from the seam edges to a degree that will greatly reduce conduction through the metal away from the seam edges when the welding device acts directly thereon.

Other objects of the invention will be apparent from the description of a specific embodiment of the apparatus utilized for effecting the same and from the drawings, or will be specifically pointed out herein.

The invention is not intended to be restricted to the construction and arrangement of parts herein shown and described, nor to the specific methods of operation, nor to the various details thereof, as the same may be modified in various particulars without departing from the spirit and scope of the invention, one practical embodiment of which has been herein illustrated and described without attempting to show all the various forms and modifications in which the invention might be embodied.

On the drawings, in which are disclosed preferred embodiments of apparatus for effecting the invention:

Fig. 4 is a plan view of a mandrel, embodying the invention, and for use specifically in welding longitudinal seams in pipe or tube;

Fig. 5 is a plan view of a form of the apparatus shown in Fig. 1, modified for use in connection with the welding of pipe or tube having helical or similarly formed seams, portions of the apparatus being broken away to illustrate the assembly of the parts;

Fig. 6 is a longitudinal vertical sectional view, on the line 6—6 of Fig. 5, the section of the outer sleeve or guide member at the upper portion being taken as if along the line of the slot therethrough to illustrate the relation of torch tip, mandrel and the metal to be welded;

Fig. 7 is a cross-section on the line 7—7 of Fig. 6; and

Fig. 8 is a plan view of a portion of metal bending apparatus for forming sheet or plate metal into helically seamed pipe or tube, illustrating the method of tying back the mandrel, in such construction, to hold it against longitudinal movement.

Figure 1:
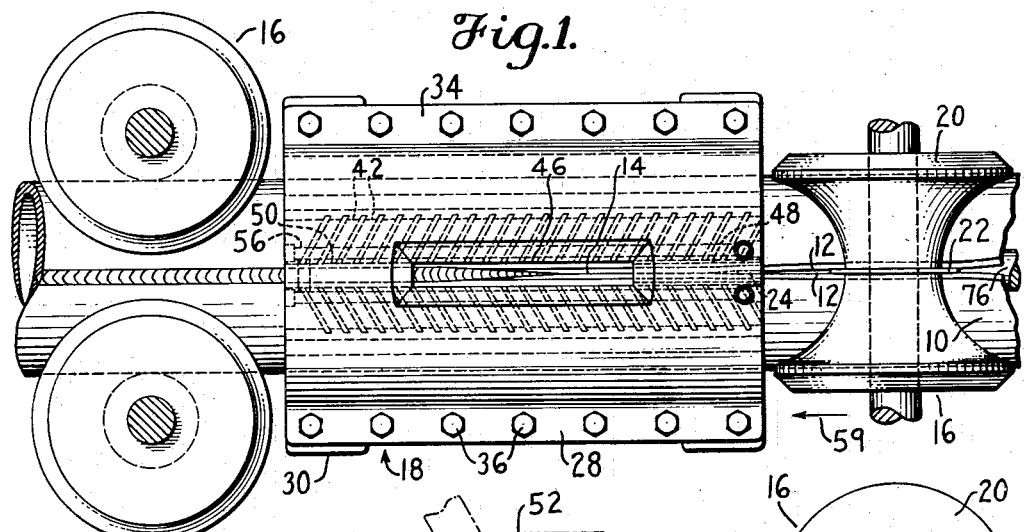
Fig. 1 is a plan view of one form of the apparatus.
Figure 2:
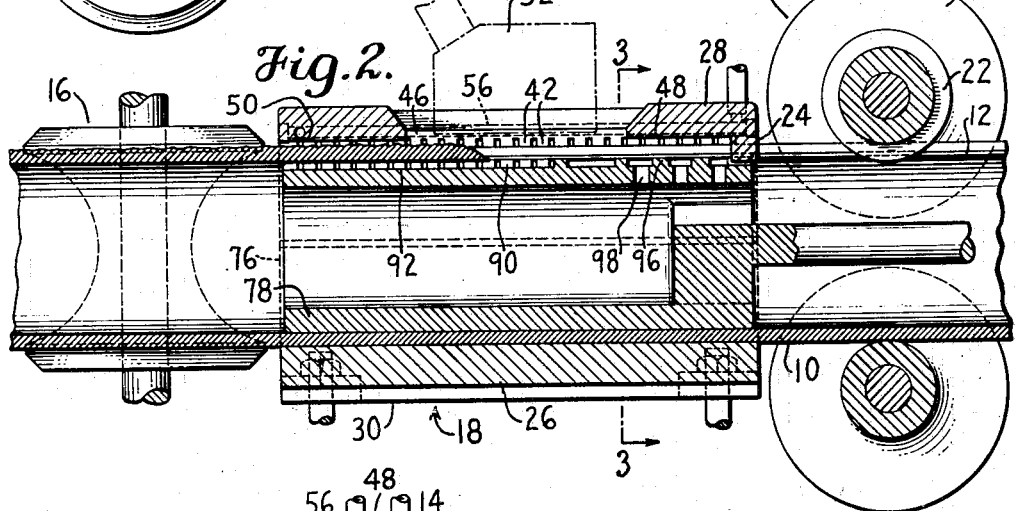
Fig. 2 is a longitudinal vertical sectional view of the apparatus shown in Fig. 1.
Figure 3:
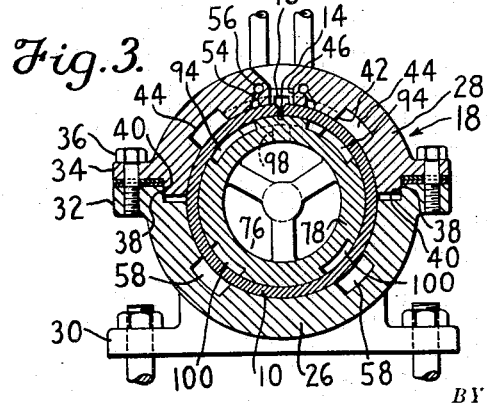
Fig. 3 is a cross-section on the line 3—3 of Fig. 2.

In the arrangements shown in Figs. 1 to 4, the invention is shown as applied in connection with processes of manufacturing pipe or tube wherein the side edges of sheet or plate metal are bent toward each other and then are welded together. In Figs. 5 to 8 the conjunction of the invention with processes of manufacturing pipe or tube in which sheet or plate has been twisted into helical form with the edges opposed to provide helical seams for welding is illustrated.

Formerly, in welding pipe of the first class, the deformed sheet has been held between rotating rolls which both forced the edges into contacting relation, and moved the bent sheet to and past the welding device. In the second class, a sleeve or like means has in some instances been utilized to retain the seam edges together, the welding means being positioned at the discharge end of the sleeve. In such cases the power for moving the bent sheet through the sleeve and the pipe finally formed away from the welding device was secured from the rolls necessary to force the flat sheet through the pipe or tube forming mill. In neither of these plans, as far as I am aware, were the seam edges contacted by any device for effectively retaining them in position immediately at the location of the heating device. It was presumed that positioning the welding rolls or the sleeve or like device in close proximity to the point at which the weld was to be produced was sufficient accurately to aline the edges. Experience, however, has shown that the contrary is often true.

In the two constructions herein set forth it will be seen that substantially the same apparatus, with minor changes in design and governed by the same theory of operation, is utilized. In the construction of Figs. 1 to 4, by bending sheet or plate metal to bring the side edges thereof into parallel relation, there is produced a tubular member 10, the adjacently disposed side edges 12 of which form a straight-line seam 14, extending longitudinally of the member. Movement of member 10 is effected by gripping the same in power-driven rolls; in the particular construction herein shown, two sets of rolls 16 are used, either set, or both sets, being power-driven.

Between the two sets of rolls is disposed a guide 18, constructed as hereinafter set forth, and through which member 10 is passed. One roll 20 of the set at the entry end of the guide may be provided with a guide fin 22. However, it may be desirable for compactness and cheapness of construction to provide a fin 24, projecting downwardly from the interior surface of the guide, to engage within the groove formed by the unclosed seam and assist in guiding such seam for cooperation in the processes hereinafter set forth. It is not necessary that both fins be used, as one alone will be sufficient to retain the seam properly in position to be welded.

Guide 18 is constructed substantially as a sleeve, made up of two substantially semi-cylindrical, separable portions 26 and 28. The base portion 26 may be provided with a footing 30 for mounting upon any suitable supporting means, while the longitudinal ends of the two portions are formed with flanges 32 and 34, which are adapted to be mated together and retained in associated relation by bolts 36 or like securing means. Machined surfaces 38 on the base portion 26 and coacting machined faces 40 engaging with the ledges and extending from the upper portion lock the portions together against any side play. By disposing shims between flanges 32 and 34 and tightening bolts 36, the portions may be adjusted relatively to each other so that pipe varying slightly in diametrical dimensions may be handled and adjustment made for wear in the use of the apparatus.

The inner surfaces of the portions provide a substantially continuous, cylindrical passage through which member 10 may slide. Extending away from a line which would be in alinement with fin 22 and/or fin 24, the walls of the upper portion 28 are grooved to provide a plurality of ribs 42. These ribs extend away from the aforesaid line, preferably at equidistant intervals, and in a desirable construction are parallel. Preferably, the ribs are disposed angularly relatively to the line of the fins and are biased in a direction opposite to that in which the pipe during the welding operation would be moving. The ribs terminate preferably at slots or depressions 44 formed longitudinally of and in the walls of the upper portion of the guide. A slot 46 cut in the upper portion, substantially on the line of the seam, opens downwardly into the body of the guide, while grooves 48 and 50 lead away from the slot on the inner surface of the portion and longitudinally thereof along the line of the seam, the ribs commencing at the slot or the grooves.

By this arrangement, when the tip 52 of oxy-fuel gas welding apparatus, or the electrode of arc welding means, or similar apparatus for producing the high temperatures necessary for welding, is disposed over or in the slot 46, so that the seam margins may be heated and fusion of the edges produced, gases heated by the action of the burner, the device, or the apparatus, or actually created by the combustion of the gases at the weld point or its immediate vicinity, will be guided through the passages formed between the ribs, heating the ribs and the metal of member 10 in proximity to such ribs. The ribs, if arranged as above set forth, will conduct the hot gases along the surface of the metal and away from the seam. The metal of the pipe spaced away from the seam margins will be heated effectively to such temperature that the difference in the temperatures of the metal at the seam margins and the body of the metal in close proximity thereto will be markedly diminished, with consequent increased efficiency in quickly raising the temperature of the metal at the seam margins, by minimizing the possibility of heat loss to the relatively cold body metal. Also, due to the gradation of temperatures in proximity to the welded seam, finer crystallization of the metal at this area will result.

The gases conducted between the ribs, where oxy-fuel gas apparatus or an electric welding arc sheathed with a combustible gas is used for producing the required heating of the metal, have among their constituents a high percentage of unburned gas capable of being burned to produce relatively high temperatures and large quantities of heat energy. Such gases, therefore, in themselves constitute heating agents which may not be overlooked and which may profitably be utilized under proper control to assist in effecting the welding operations herein dealt with. It is intended, by the provision of means such as tuyères 54, to burn such gases in the passages between the ribs. These tuyères are short passages or discharge ports in the upper portion 28 of the guide, these ports delivering into the grooves between the ribs 42 and being supplied with air or oxygen through longitudinal ducts 56 in the guide, these ducts being connected, in turn, by one or more external conduits 57 with a suitable source of compressed air or oxygen, which it has not been thought necessary to illustrate. By such aid, the heat available from such gases is released and directly applied for preheating the metal of the tube body at points spaced away from the seam edges and forwardly of the point at which the welding operation is being performed. In this manner, the heating effects of the gases are extended over a wider portion of the surface of the tube, tending to produce in the metal of the tube walls in proximity to the seam margins a temperature which is more substantially uniform throughout, so that the influence of expansive and contractive stresses will be more uniformly applied throughout the member.

When an oxyacetylene torch welder, such as illustrated, is employed, a forced supply of air or oxygen to burn the envelope gases (hydrogen and carbon monoxide) within the guide and in contact with the surface of the pipe, may or may not be used. Without this supply, the high velocity flame jets delivered from the torch burner will entrain atmospheric air and draw it through the slotted opening 46, so that it mingles with the copious envelope gases and burns them as they flow through the spaces or passages between the guide and the tube being welded.

The gases, after they have followed the path defined by the ribs, are spilled into the runway provided by depressions 44 and thence are conducted out of the guide. Similar depressions 58 may be formed in the walls of base portion 26, both to reduce the area of metal contacted by the guide and to act as spillways for gases which may pass down and around member 10 farther than depressions 44. Groove 48 permits the gases to travel rearwardly along the seam edges and contrary to the direction of movement of the member 10 indicated by the arrow 59, thereby directly preheating such edges before the welding device becomes directly effective thereon. Groove 50 permits the welded seam to move along freely without danger of too rapid chilling, or other interference during the period that congelation of the molten metal is occurring.

In the construction of Figs. 5, 6 and 7, the construction of Figs. 1 to 4 has been redesigned for use in connection with the welding of helical seams produced by twisting sheet or plate metal. The pushing and delivery rolls may, and have, in the example herein illustrated, been eliminated, although some suitable means may be provided, if desired or necessary, to supply the power requisite to feed and turn the tube or pipe as it passes from its forming mill and through the guide 60 to be welded. The ribs 61 in this instance are disposed on each side of a groove 62, a slot 64 and a groove 66 which follow the line of the helical seam. The depressions 68 and 70 of the upper and lower members 72 and 74, respectively, are preferably helical to account properly for, and to provide bearing for, the rotating and longitudinally moving pipe or tube.

It may be desirable, under certain conditions, to provide means for supporting the metal at the seam margins both from below and from above, as is customarily done when welding flat sheet or plate edges. No provision has previously been made for such operation in the case of fusion welding pipe or tube, so far as I am informed, because of the resultant defects and chilling of the weld due to the contact of cold metal with the very hot metal at the seam. However, I have overcome these difficulties by providing, as shown in Figs. 1 to 4, in conjunction with the straight-line seam welding apparatus, a mandrel 76 of a contour conforming to that of the tubular member to be handled and having a hollow interior. The outside dimensions of the mandrel are preferably slightly less than the internal dimensions of the pipe or tube to be handled. In the particular construction of Fig. 8, the mandrel, applied to welding helical seams, is shown as having a connection 80 with the stake 86 of a forming mill 88, used to bend or twist metal into helical form. The connection is designed to permit movement of the mandrel vertically and sideways, and also to permit it to rotate. The mandrel shown in Figs. 1 to 4, used in connection with the welding of longitudinally seamed tubing, is supported so that it does not rotate. The manner of connecting the mandrel to a suitable stationary part will be understood by those familiar with such matters.

The portion of the mandrel surface over which the seam edges are intended to pass in traveling past the welding device is grooved or otherwise cut out to form a plurality of spaced apart ribs 90. Preferably the ribs are equidistantly spaced and parallel, and extend away from the line which the seam edges will be compelled to follow. Also, the ribs on opposite sides of the said line are preferably arranged to converge in the direction of movement of the seam edges. All ribs terminate at a common depression 92 along the line of the seam movement; the ribs on each side of the line terminate at their respective groove or slot 94 in the body of the mandrel which serves as a spillway for gases delivered thereto from the grooves between the sets of ribs.

Gases forced down through the groove of the seam by the jet pressure, where a pressure supply is used to heat or blanket the seam, will be caught in depression 92 and will then pass between the ribs, heating the same and the body of the metal resting thereon. Because of the particular disposition of the ribs, the gases will pass rearwardly of the pipe or tube, heating the metal thereof in advance of its arrival at the position of the burner or other heating means used to raise the temperature of the seam edges to fusion.

From the passages between the ribs, the hot gases are spilled into the grooves 94 to be led back to a series of ribs 96 arranged to conduct such gases inwardly thereof to a series of openings 98. These openings communicate with the hollow central portion of the mandrel, through which the gases now pass, giving up more of their heat to the body of the mandrel and thus bringing the temperature thereof more nearly to that of the body of the pipe heated directly by the burner or like device.

Additional kerfs 100 may be formed in the outer surface of the mandrel, paralleling grooves 94, to reduce the surface of the mandrel in frictional engagement with the interior surface of the pipe or tube and providing further spillways for gas movement along the walls of the pipe or tube.

In Figs. 5, 6 and 7, there is illustrated a mandrel 102 of modified construction, especially adapted for use in the manufacture of helical seamed pipe. As has been noted, the twisted sheet on leaving the bending mill is moving both longitudinally and rotationally. The degree of restraint applied against either of the these movements may be critical in the final determination of the efficient and accurate welding of the seam. While in pipe having seams extending along single straight lines, or which are encompassed within in a single plane, it is possible to disregard frictional drag upon the pipe walls imposed by mandrels of the type hereinbefore set forth, it is essential in the manufacture of pipe from helically twisted metal, in order that the helix continue in its preformed condition, that the frictional drag upon the walls of the pipe be reduced to a minimum.

For this purpose mandrel 102 is carried either directly by the rotating stake roll of the forming machine 88 or by means of a ball and socket connection is assembled either with the stake roll or with some other suitable portion of the forming machine so as to be capable of free rotational movement while being anchored against movement lengthwise of the pipe. In this manner possible frictional drag as the bent sheet moves past the torch is limited to the longitudinal drag only, the rotational resistance being substantially eliminated.

For the purpose of guiding hot gases from the point of application of the heating element into adjacency to the inner surface of the tubularly formed metal, the face of the mandrel is formed with a plurality of ribs which are disposed to cross the line of the seam at an angle substantially the same as that set forth above for the mandrel 76. In a simplified construction, the results set forth may be attained by forming in the surface of mandrel 102 a plurality of rectangular bosses 110, forming a plurality of passages 112 extending circumferentially around the outer surface of the mandrel and intersected by other groups of passages 114 extending longitudinally along the surface of the mandrel. By this arrangement the necessary support for the metal at the seam edges is continuously provided, while sufficient relief against constant contact with the relatively cold mandrel metal of the heated tube metal is assured. Also, as the hot gases produced during the heating of the metal pass within the tubularly formed member, they are caught by the passageways between the ribs and are guided along the surface of the walls, heating the metal of the walls and of the ribs in the manner already set forth.

While the relief from excessive conduction, as above set forth, will react to permit efficient welding to proceed, it is desirable in order to permit maximum penetration of the fused condition of the metal to cut back the mandrel entirely at the portion thereof where, according to plan, the metal of the seam edges should have arrived at a state of fusion. The space 116 thus provided acts also as means for the initial reception of the hot gases before their distribution into the various passages 112 and 114.

Thus, as the pipe rotates and moves longitudinally, the mandrel under the compulsion of the frictional grip of the pipe will also rotate. Welding above space 116 will continue, undisturbed by the heat robbing effect of relatively cold metal beneath, the preheating of the metal being carried forward, due to the arrangement of passages 112 and 114, substantially in the same manner as in the case of mandrel 76. The gases may, if so desired, be guided by openings 118 into the interior of the mandrel to assist in maintaining the temperature thereof at a sufficiently high level to reduce the heat-removing tendency of the mandrel.

It is to be understood that the adjustment provided by bolts 36 and the shims used in conjunction therewith may also be utilized for the purpose of securing a desired compression upon the metal at the seam, as for forcibly driving the seam edges together to secure a predetermined degree of upsetting during the welding operation.

As many changes could be made in the construction and process herein involved, and many widely different embodiments of the invention designed without departing from the scope of the invention as defined in the accompanying claims, the matter set forth by the above description is intended to be interpreted as illustrative of an operative, but not a limiting, embodiment of the invention.

I claim:

1. Apparatus for pipe or tube welding operations which includes: a guide providing a passage for the movement of such pipe or tube therethrough, means in said guide for bearing against the surface of the pipe or tube to retain the seam edges thereof in welding relation, said means being formed to conduct into the guide gases from the vicinity of said seam, a cylindrical body for reception within the pipe or tube being welded, and portions of said body being formed to contact the inner surface of said pipe or tube and to conduct gases away from the seam portion and along the inner surface of said pipe or tube.

2. Apparatus for pipe or tube welding operations which includes: a guide consisting of a pair of separable members providing when mated a passage for the movement of such pipe or tube therethrough, one of said members having means therein for bearing against the surface of the pipe or tube to retain the seam edges thereof in welding relation, said means consisting of a plurality of spaced apart ribs projecting from the walls of said passage, said member having a slot therethrough and through said ribs, and grooves within said member, through said ribs, and communicating with said slot, said slot and said grooves being immediately along the line where the seam edges will pass, the passages between the ribs opening into said slot or said grooves and leading away from the seam edges into the interior of the guide.

3. Apparatus for pipe or tube welding operations which includes: a guide, providing a passage for the movement of such pipe or tube therethrough, means in said guide for bearing against the surface of the pipe or tube to retain the seam edges thereof in welding relation, said member having a slot therethrough and through said means immediately along the line where the seam edges will pass, said means being formed to conduct into the guide gases from said slot.

4. Apparatus for pipe or tube welding operations which includes: a guide having a passage for the movement of such pipe or tube therethrough, and means within the passage for bearing against the surface of the pipe or tube to retain the seam edges thereof in welding relation, said means consisting of a plurality of spaced apart parallel ribs projecting from the walls of said passage and angularly disposed on either side of and relatively to the seam to be welded, and converging in the direction of travel of said seam, said ribs being formed to conduct into said guide gases from the vicinity of said seam.

5. Apparatus for pipe or tube welding operations which includes: a guide having a passage for the movement of such pipe or tube therethrough, and means within the passage for bearing against the surface of the pipe or tube to retain the seam edges thereof in welding relation, said means consisting of a plurality of spaced apart parallel ribs projecting from the walls of said passage and angularly disposed on either side of and relatively to the seam to be welded, said ribs being formed to conduct into said guide gases from the vicinity of said seam.

6. Apparatus for pipe or tube welding operations which includes: a guide having a passage for the movement of such pipe or tube therethrough, and means within the passage for bearing against the surface of the pipe or tube to retain the seam edges thereof in welding relation, said means consisting of a plurality of spaced apart ribs projecting from the walls of said passage, said ribs being formed to conduct into said guide gases from the vicinity of said seam.

7. Apparatus for pipe or tube welding operations which includes: a guide through which the pipe is moved and which substantially encloses the pipe at and including the region where the pipe is welded by the application of heat, said guide having means therein for bearing against the surface of the pipe or tube to retain the seam edges thereof in welding relation, said means being formed to conduct into said guide and over the surface of the pipe or tube gases from the vicinity of said seam.

8. In apparatus for manufacturing pipe or tube by fusing closed a seam provided in a tubular blank, a mandrel for positioning within said blank to retain the seam edges in properly associated relation while the edges are being fused together, means for moving the blank along the mandrel, the body of said mandrel at that portion thereof with which the seam edges will contact being formed with a plurality of spaced apart parallel ribs for bearing against said edges, said ribs providing passages therebetween adapted to conduct hot gases in contact with the surface of the work to conduct heat to the body of the blank away from the welding region.

9. In apparatus for manufacturing pipe or tube by fusing closed a seam provided in a tubular blank, a mandrel for positioning within said blank to retain the seam edges in properly associated relation while the edges are being fused together, means for moving the blank along the mandrel, portions of the body of said mandrel being formed to contact with the inner surface of the tubular blank along the seam margins thereof, and to conduct along the walls of the blank, in order to heat them, gases discharged through the open seam during the fusing operation.

10. In apparatus for manufacturing pipe or tube by fusing closed a seam provided in a tubular blank, a mandrel for positioning within said blank to retain the seam edges in properly associated relation while the edges are being fused together and to conduct along the walls of the blank, to heat the same, gases discharged through the open seam, the body of the mandrel being hollow, and means for conducting gases from the outer surface to the interior thereof.

11. In apparatus for manufacturing pipe or tube by fusing closed a seam provided in a tubular blank, a mandrel positioned within the blank and along which the blank is moved while the edges are being fused together, said mandrel having channels to conduct along the walls of the blank gases discharged through the open seam in order to heat the body of the blank.

12. The process of welding seams in pipe or tube members which includes: effecting relative motion of an unwelded portion of a pipe or tube member past an oxy-fuel gas torch for fusing closed a seam in said member, guiding the seam in substantially constant relation to said torch, and guiding hot gases away from the vicinity of said torch and around said member.

13. The process of welding seams in pipe or tube members which includes: effecting relative motion of an unwelded portion of a pipe or tube member past a hot gas emitting device for fusing closed a seam in said member, guiding the seam in substantially constant relation to said device, and guiding hot gases away from the vicinity of said device and around said member.

14. The process of welding seams in pipe or tube members which includes: effecting relative motion of an unwelded portion of a pipe or tube member past a device for fusing closed a seam in said member, simultaneously constraining the seam edges into welding relation by bearing against the body of the member at a plurality of separated portions thereof while guiding the seam in substantially constant relation to said device, and restricting hot gases to movement away from the vicinity of said seam, through the means bearing against the body of the member, and around said member.

15. The process of welding seams in pipe or tube members which includes: effecting relative motion of an unwelded portion of a pipe or tube member past a device for fusing closed a seam in said member, simultaneously constraining the seam edges into welding relation by bearing against the body of the member at a plurality of separated portions thereof in proximity to said seam while guiding the seam in substantially constant relation to said device, and restricting hot gases to movement away from the vicinity of said seam and around said member.

16. The process of welding seams in pipe or tube members which includes: effecting relative motion of an unwelded portion of a pipe or tube member past a device for fusing closed a seam in said member, guiding the seam in substantially constant relation to said device, and positively restricting hot gases to movement away from the vicinity of said seam and into a path around and in close proximity to the surface of said member so that said gases flow toward that portion of the seam which is unwelded.

17. The process of welding seams in pipe or tube members which includes: effecting relative motion of an unwelded portion of a pipe or tube member past a device for fusing closed a seam in said member, guiding the seam in substantially constant relation to said device, and positively restricting hot gases to movement away from the vicinity of said seam and into a path around and in close proximity to the surface of said member.

18. In the manufacture of pipe, tube or tubing from tubularly formed sheet or plate metal having a substantially continuous unwelded portion in which relative motion of the unwelded portion of said tubularly formed metal and a device for welding said portion is effected, the steps constraining the tubularly formed metal by bearing against the same at a plurality of spaced regions, and welding the material while thus constrained and simultaneously conducting hot gases away from the neighborhood at which welding is taking place and along the body of the tubularly formed metal.

JAMES L. ANDERSON.